United States Patent
Jang

(10) Patent No.: US 12,455,606 B2
(45) Date of Patent: Oct. 28, 2025

(54) CONTROLLER EXECUTING ACTIVATION MODE OR LOW POWER MODE BASED ON STATE OF MULTIPLE SUB-CIRCUITS AND OPERATING METHOD THEREOF

(71) Applicant: SK hynix Inc., Icheon-si (KR)

(72) Inventor: In Jong Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 338 days.

(21) Appl. No.: 17/659,160

(22) Filed: Apr. 13, 2022

(65) Prior Publication Data
US 2023/0195193 A1 Jun. 22, 2023

(30) Foreign Application Priority Data
Dec. 21, 2021 (KR) .................. 10-2021-0183831

(51) Int. Cl.
*G06F 1/3206* (2019.01)
*G06F 1/3234* (2019.01)

(52) U.S. Cl.
CPC .......... *G06F 1/3206* (2013.01); *G06F 1/3234* (2013.01)

(58) Field of Classification Search
CPC ................ G06F 1/3206; G06F 1/3234
See application file for complete search history.

(56) References Cited

U.S. PATENT DOCUMENTS

| 7,428,645 B2 * | 9/2008 | O'Connor ............. G06F 9/3885 713/323 |
| 8,862,917 B2 | 10/2014 | Ulmer et al. |
| 2011/0173474 A1 * | 7/2011 | Salsbery ............... G06F 1/3203 713/323 |
| 2019/0155723 A1 * | 5/2019 | Park .................... G06F 12/0862 |
| 2019/0188127 A1 * | 6/2019 | Lee ..................... G06F 11/1068 |

FOREIGN PATENT DOCUMENTS

KR 10-2021-0101632 8/2021

* cited by examiner

*Primary Examiner* — Paul Yen
(74) *Attorney, Agent, or Firm* — Weaver Austin Villeneuve & Sampson LLP

(57) ABSTRACT

Embodiments of the present disclosure relate to a controller and operation method thereof. According to embodiments of the present disclosure, the controller may include i) a plurality of sub-circuits and ii) a processor configured to: determine the state of the plurality of sub-circuits, determine whether activation conditions corresponding to the plurality of sub-circuits are satisfied at a first time point, and control the controller to operate in an activation mode or in a low-power mode at a second time point, depending on whether the activation conditions corresponding to the plurality of sub-circuits are satisfied.

18 Claims, 22 Drawing Sheets

CONTROLLER EXECUTING ACTIVATION MODE OR LOW POWER MODE BASED ON STATE OF MULTIPLE SUB-CIRCUITS AND OPERATING METHOD THEREOF

CROSS-REFERENCE TO RELATED APPLICATION

The present application claims priority under 35 U.S.C. 119 (a) to Korean patent application number 10-2021-0183831 filed on Dec. 21, 2021, which is incorporated herein by reference in its entirety.

TECHNICAL FIELD

The embodiments of the present disclosure relate to a controller executing activation mode or low-power mode based on state of multiple sub-circuits and operating method thereof.

BACKGROUND

A memory system includes a data storage device that stores data on the basis of a request from a host, such as a computer, server, a smartphone, a tablet PC, or other electronic devices. The examples of the memory system span from a traditional magnetic-disk-based hard disk drive (HDD) to a semiconductor-based data storage device such as a solid state drive (SSD), a universal flash storage (UFS) device, or an embedded multimedia card (eMMC) device.

The memory system may further include a memory controller for controlling a memory device. The memory controller may receive a command from the host and, on the basis of the received command, may execute the command or control read/write/erase operations on the memory device(s) in the memory system. The memory controller may be used to execute firmware operations for performing a logical operation for controlling such operations.

In general, the memory system reduces the amount of current used to reduce power consumption when a command is not inputted from the host for a predetermined time. However, the frequency with which commands from the host are inputted into the memory system may change over time. As a result, the memory system may unnecessarily consume power or degrade performance.

SUMMARY

Various embodiments of the disclosed technology are directed to a controller and operating method capable of preventing the controller from consuming power unnecessarily or degrading performance.

In one aspect, the disclosed technology may provide a controller including i) a plurality of sub-circuits and ii) a processor configured to: determine the state of the plurality of sub-circuits, determine whether activation conditions corresponding to the plurality of sub-circuits are satisfied at a first time point, and control the controller to operate in an activation mode using a current greater than or equal to an activation current value or in a low-power mode using a current lower than the activation current value at a second time point, depending on whether the activation conditions for the plurality of sub-circuits are satisfied. The second time point is a time point after a predetermined time has elapsed from when a current equal to or greater than the activation current value is used to process a command from outside of the controller.

In this case, the processor may control the controller to operate in the activation mode at the second time point on determination that at least one of the activation conditions corresponding to the plurality of sub-circuits is satisfied.

In another aspect, the disclosed technology may provide a method for operating a controller including i) determining a state of a plurality of sub-circuits, ii) determining whether activation conditions corresponding to the plurality of sub-circuits are satisfied at a first time point and iii) operating in an activation mode using a current greater than or equal to an activation current value or in a low-power mode using a current lower than the activation current value at a second time point, depending on whether the activation conditions for the plurality of sub-circuits are satisfied. The second time point is a time point after a predetermined time has elapsed from when a current equal to or greater than the activation current value is used to process a command from the outside of the controller.

In this case, the controller may operate in the activation mode at the second time point on determination that at least one of the activation conditions corresponding to the plurality of sub-circuits is satisfied.

According to embodiments of the disclosed technologies, it is possible to prevent the controller from consuming power unnecessarily or degrading its performance.

DETAIL DESCRIPTION OF THE EXEMPLARY EMBODIMENTS

Figure 1:
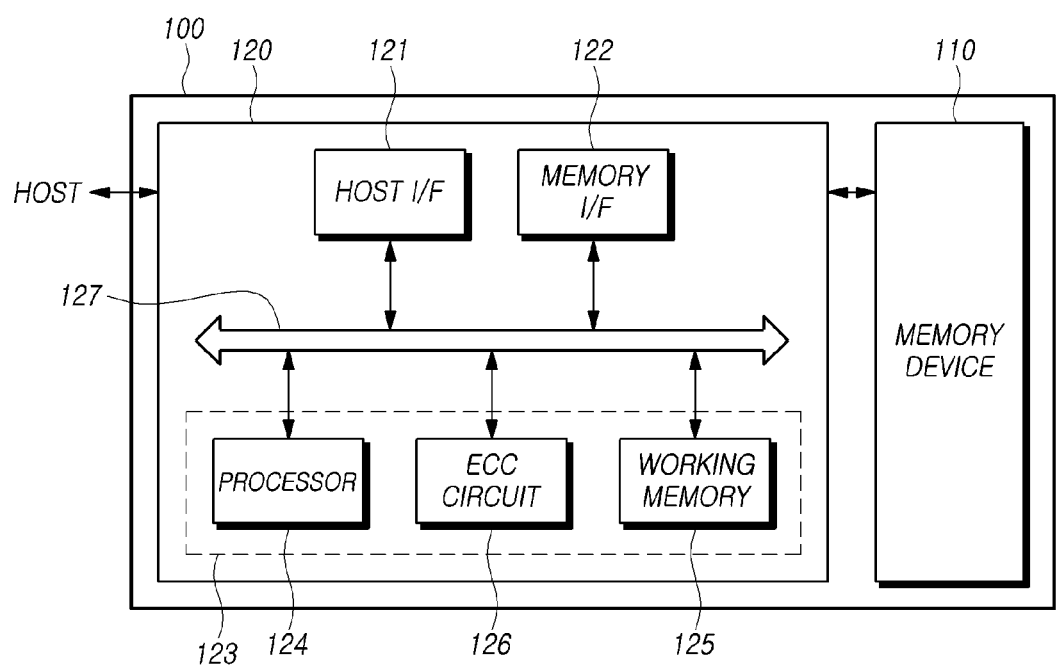
FIG. 1 is a schematic diagram illustrating a configuration of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein, or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface (memory I/F) 122, a control circuit 123, and a host interface (host I/F) 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using error correction code(s). The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. A sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
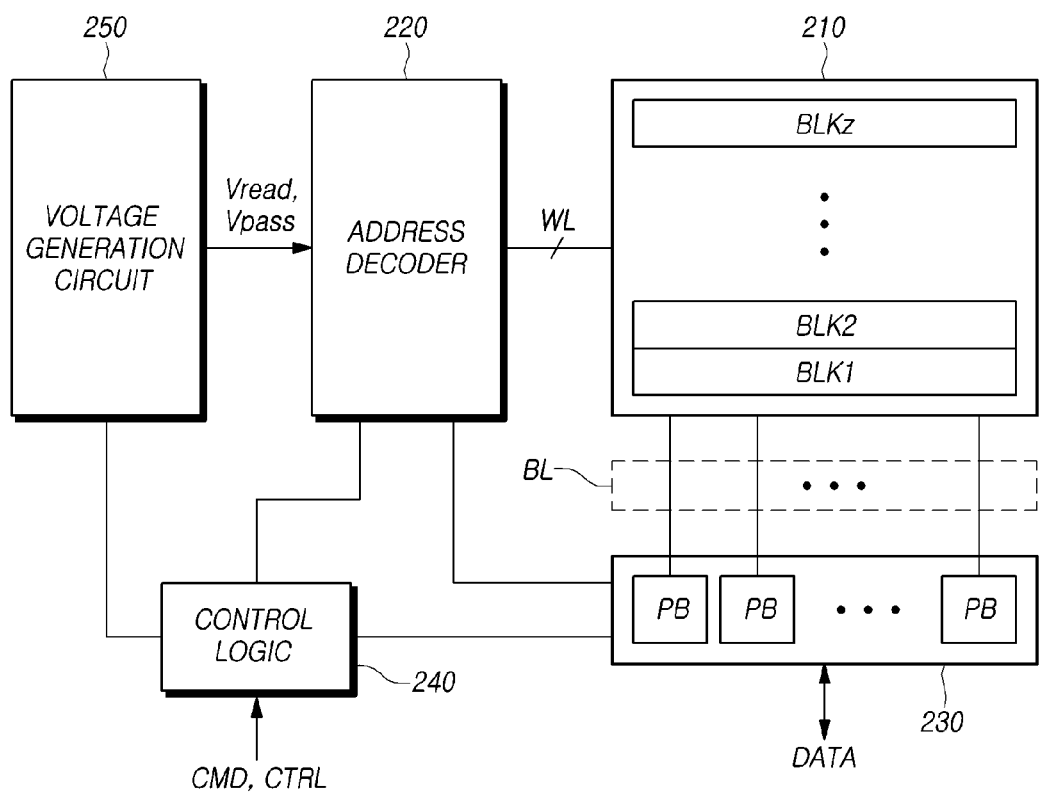
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a layer having a material that can hold an electrical charge.

For example, the transistor TR arranged in each memory cell MC may include a drain, a source, and a gate. The drain (or source) of the transistor TR may be connected to the corresponding bit line BL directly or via another transistor. The source (or drain) of the transistor TR may be connected to the source line (which may be the ground) directly or via another transistor. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
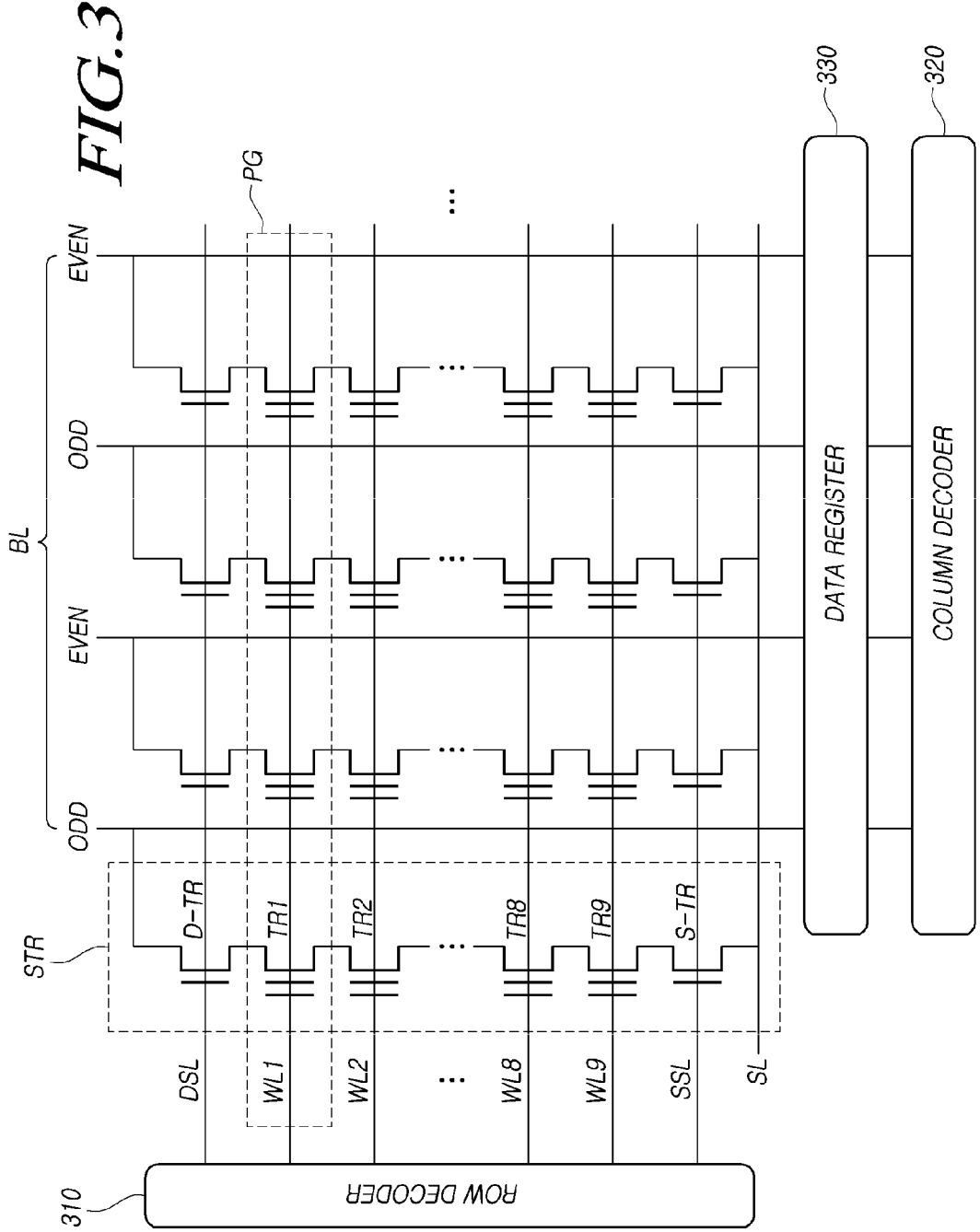
FIG. 3 is a diagram illustrating a structure of word lines and bit lines of a memory device based on an embodiment of the disclosed technology.

FIG. 3 is a diagram illustrating a structure of word lines WL and bit lines BL of a memory device (e.g., memory device 110) based on an embodiment of the disclosed technology.

Referring to FIG. 3, the memory device has a core area in which memory cells MC are arranged, and an auxiliary area (the remaining area other than the core area) to include circuitry that is used to perform the operations of the memory cell array (e.g., memory cell array 210).

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line is coupled in common to a column decoder 320.

In accessing a memory cell MC, the row decoder 310 and the column decoder 320 are used to locate a desired memory cell based on the address.

In some implementations, all data processing performed by the memory device 110, including program and read operations, may occur via the data register 330. If data processing by the data register 330 is delayed, some or all of the other areas may need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch circuit that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
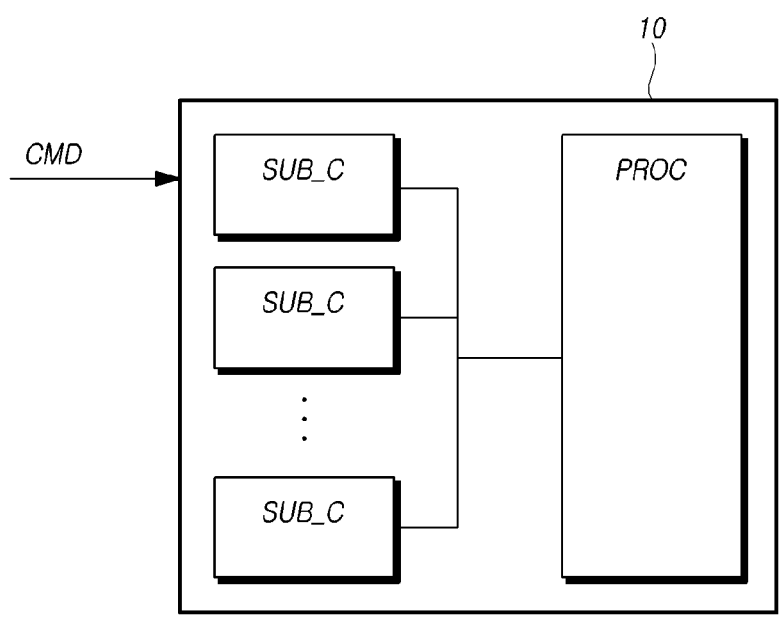
FIG. 4 is a diagram illustrating a schematic structure of a controller based on an embodiment of the disclosed technology.

FIG. 4 is a diagram illustrating a schematic structure of a controller 10 based on an embodiment of the disclosed technology.

Referring to FIG. 4, the controller 10 may include a plurality of sub-circuits SUB_C and a processor PROC.

Each of the plurality of sub-circuits SUB_C is a hardware module configured to execute a specific operation inside the controller 10.

The processor PROC may be electrically connected to the plurality of sub-circuits SUB_C. The processor PROC may be directly connected to each of the plurality of sub-circuits SUB_C through conductive lines or indirectly through another module.

The processor PROC may determine the state of the plurality of sub-circuits SUB_C connected to the processor PROC. If necessary, the processor PROC may request the plurality of sub-circuits SUB_C to perform a specific operation.

Meanwhile, the controller 10 may receive a command CMD from the outside of the controller 10. The processor PROC may execute a logical operation for processing an operation (e.g., a read operation/write operation) requested by the received command CMD. For example, the operation of receiving the command CMD from the outside of the controller 10 may be executed by at least one of the plurality of sub-circuits SUB_C.

Meanwhile, the controller 10 and the plurality of sub-circuits SUB_C and the processor PROC included in the controller 10 may be implemented in various ways.

For example, the controller 10 may be the memory controller 120 described in FIG. 1. In addition, the processor PROC may be the processor 124 described in FIG. 1. In addition, each of the plurality of sub-circuits SUB_C may be the host interface 121, the memory interface 122, the working memory 125, the error detection/correction circuit 126 described in FIG. 1, or other hardware module.

For example, the controller 10 may be a SoC (System on Chip). In addition, the processor PROC may be a microprocessor included in the SoC. In addition, the plurality of sub-circuits SUB_C may include one or more IP (Intellectual property) blocks inside the SoC.

Hereinafter, an operation performed by the controller 10 in embodiments of the present disclosure will be described in detail with reference to the flow chart of FIG. 5.

Figure 5:
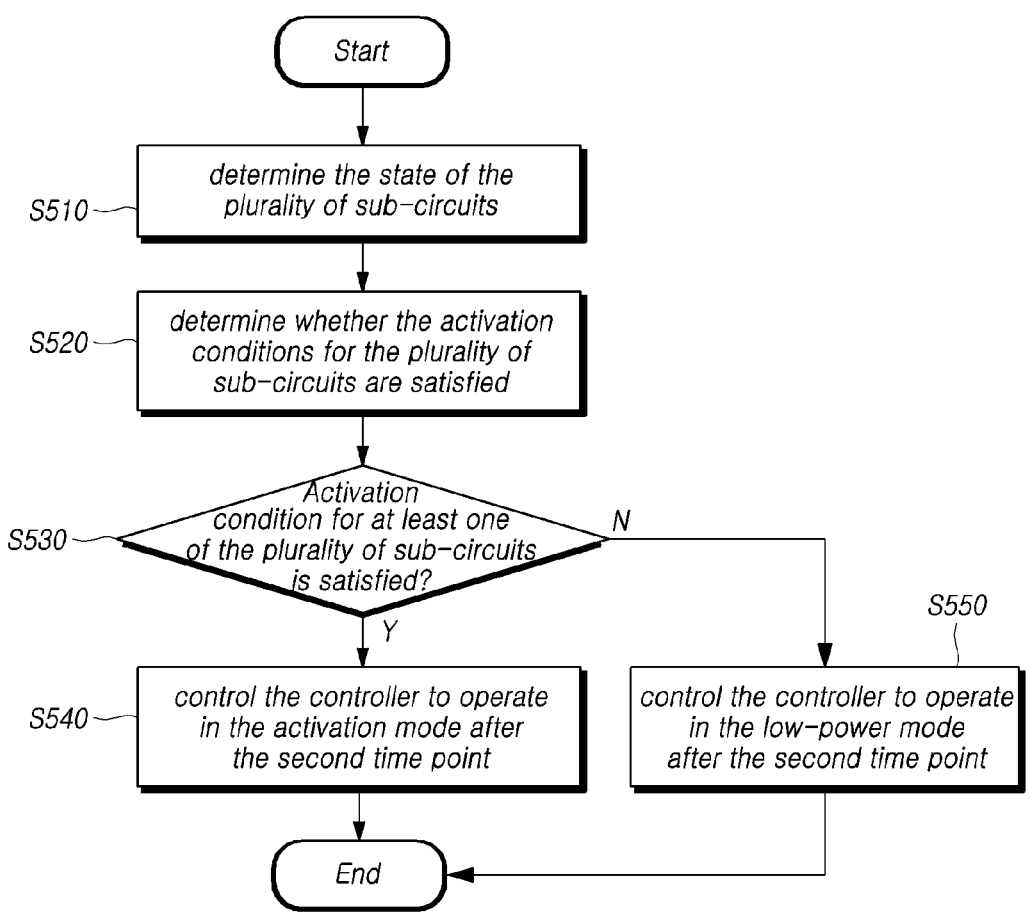
FIG. 5 is a flow chart illustrating a schematic operation of the controller based on an embodiment of the disclosed technology.

FIG. 5 is a flow chart illustrating a schematic operation of the controller 10 based on an embodiment of the disclosed technology.

Referring to FIG. 5, the processor PROC of the controller 10 may determine the state of the plurality of sub-circuits SUB_C at a first time point (S510).

In this case, the processor PROC may determine the first time point in various ways. For example, the processor PROC may randomly determine the first time point.

For another example, the processor PROC may determine, as the first time point, a time point when a predetermined time elapses after the controller 10 receives the command CMD from the outside of the controller 10. In this case, the first time point may be a time point before the time point when the controller 10 automatically starts to operate in a low-power mode after receiving the command CMD from the outside of the controller 10.

The processor PROC may determine whether the activation conditions for the plurality of the sub-circuits SUB_C are satisfied at the first time point, based on the state of the plurality of sub-circuits SUB_C determined in step S510 (S520).

The processor PROC may determine whether the controller 10 operates in an activation mode or a low-power mode at the second time point, depending on whether the activation conditions for the plurality of sub-circuits SUB_C are satisfied.

In this case, the second time point may be a time point after a predetermined time has elapsed from the time point when the controller 10 uses a current greater than or equal to a set activation current value after receiving the command CMD from outside of the controller 10.

In this case, the length of the predetermined time may be preset or determined according to information of the command CMD (e.g., the type of the command CMD, or the size of the data requested by the command CMD to read or write, etc.) received from the outside of the controller 10. The second time point may be the same point in time as the first time point, or may occur later than the first time point.

When the controller 10 operates in the activation mode, it means that the controller 10 consumes a current greater than or equal to the set activation current value. In this case, the performance of the controller 10 may be improved, but the power consumption of the controller 10 may be increased.

When the controller 10 operates in the low-power mode, it means that the controller 10 consumes a current lower than the set activation current value. In this case, the power consumption of the controller 10 may be reduced, but the performance of the controller may be degraded.

Specifically, the processor PROC determines whether an activation condition for at least one of the plurality of sub-circuits SUB_C is satisfied (S530).

On determination that the activation condition for at least one of the plurality of sub-circuits SUB_C is satisfied (S530—Y), the processor PROC may control the controller 10 to operate in the activation mode after the second time point (S540).

If the controller 10 operates in the low-power mode in a situation where at least one of the plurality of sub-circuits SUB_C needs to be activated, the sub-circuit may lack the sufficient electrical current to be activated. Therefore, the sub-circuit to be activated may malfunction or operate at a low speed. In this case, the performance of the controller 10 may be degraded. In particular, when a new command is received immediately after the controller 10 starts to operate in the low-power mode, it can take time for the controller 10 to transition back to the activation mode again to process the new command, and thus the performance of the controller 10 may be degraded.

Accordingly, when at least one of the plurality of sub-circuits SUB_C need to be activated, the controller 10 does not operate in the low-power mode and instead continues to operate in the activation mode, thereby preventing performance degradation.

On the other hand, on determination that activation conditions for all of the plurality of sub-circuits SUB_C are not satisfied, the processor PROC may control the controller 10 to operate in a low-power mode after the second time point (S550).

This is because the controller 10 may consume more power than the amount of power required for the operation as a result, if the controller 10 operates in the activation mode even when all of the plurality of sub-circuits SUB_C do not need to be activated.

Accordingly, when all the plurality of sub-circuits SUB_C do not need to be activated, the controller 10 may prevent unnecessary power consumption by operating in the low-power mode.

In this way, the processor PROC may prevent the controller 10 from consuming power unnecessarily or causing a performance degradation of the controller 10, depending on the state of the plurality of sub-circuits SUB_C.

Hereinafter, change of the amount of current used by the controller 10 will be described in FIG. 6 and FIG. 7.

Figure 6:
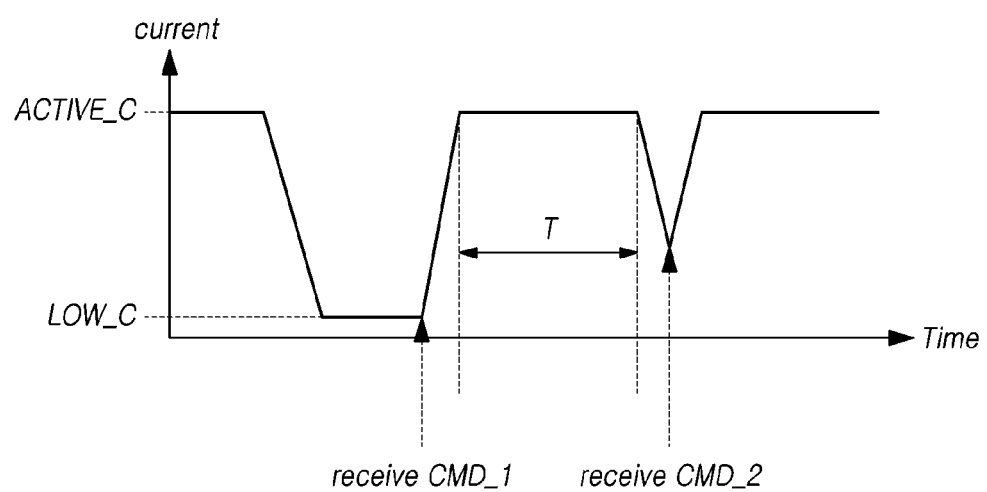
FIG. 6 is a diagram illustrating an example of the change of the amount of current used by the controller.

FIG. 6 is a diagram illustrating an example of the change of the amount of current used by the controller 10.

Referring to FIG. 6, the controller 10 may operate in a state using a current equal to or greater than an activation current value ACTIVE_C and in a state using a low-power current value LOW_C.

Thereafter, when the controller 10 receives a command CMD_1 from the outside of the controller 10, the controller 10 may operate in the activation mode using a current greater than or equal to the activation current value ACTIVE_C in order to process the command CMD_1. The controller 10 may maintain a state operating in the activation mode for a predetermined time T from a time point when the current consumed reaches a value equal to or greater than the activation current value ACTIVE_C from the low-power current value LOW_C. The predetermined time T may correspond to the amount of time needed to process the command CMD_1 using an electrical current greater than or equal to the activation current value ACTIVE_C.

Thereafter, the controller 10 reduces the current consumed by the controller 10 from the activation current value ACTIVE_C to the low-power current value LOW_C in order to reduce power consumption.

In this case, the controller 10 may receive a new command CMD_2 from the outside of the controller 10 while reducing the current consumed from the activation current value ACTIVE_C to the low-power current value LOW_C. The controller 10 needs to increase the amount of current consumed again to be greater than or equal to the activation current value ACTIVE_C in order to process the new command CMD_2.

As describe above, since it takes time for the controller 10 to increase the amount of current consumed to process the new command CMD_2 to more than the activation current value ACTIVE_C again, there may be a problem that the time when the controller 10 processes the new command CMD_2 is delayed.

Figure 7:
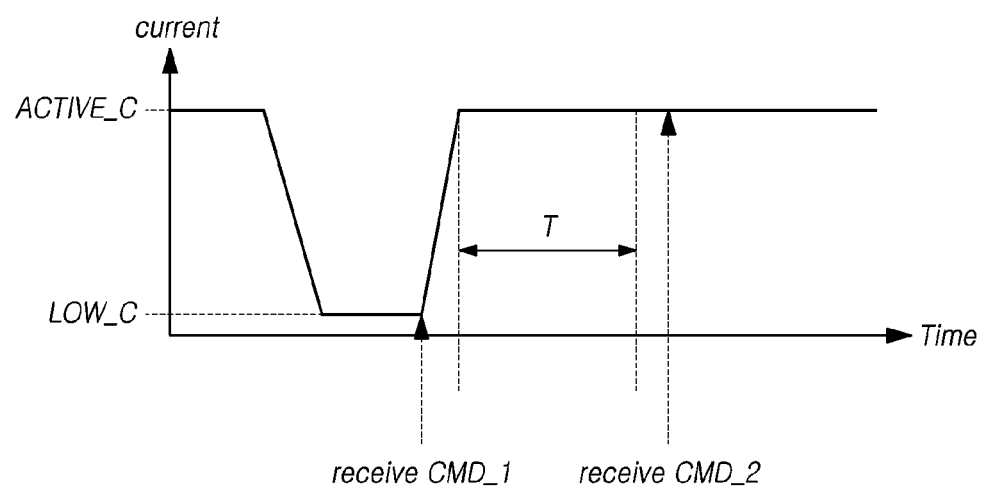
FIG. 7 is a diagram illustrating another example of the change of the amount of current used by the controller based on an embodiment of the disclosed technology.

FIG. 7 is a diagram illustrating another example of the change of the amount of current used by the controller 10 based on an embodiment of the disclosed technology.

Referring to FIG. 7, similarly to FIG. 6, the controller 10 may operate in a state of consuming a current greater than or equal to the activation current value ACTIVE_C and then consuming a low-power current value LOW_C lower than the activation current value ACTIVE_C.

Thereafter, when the controller 10 receives the command CMD_1 from the outside of the controller 10, the controller 10 may operate in the activation mode consuming a current greater than or equal to the activation current value ACTIVE_C in order to process the command CMD_1. The controller 10 may maintain a state of operating in the activation mode for a predetermined time T from a time point when the current consumed reaches a value equal to or greater than the activation current value ACTIVE_C from the low-power current value LOW_C. The predetermined time T may correspond to the amount of time needed to process the command CMD_1 using an electrical current greater than or equal to the activation current value ACTIVE_C.

Then, the controller 10 may continue to operate in the activation mode using a current greater than or equal to the activation current value ACITVE_C, instead of reducing the amount of current to be used from the active current value ACTIVE_C to the low-power current value LOW_C as in FIG. 6. As described in FIG. 5, when it is determined that the activation condition for at least one of the plurality of sub-circuits SUB_C included in the controller 10 is satisfied, the controller 10 may operate as described above.

In this case, when the controller 10 receives the new command CMD_2 from the outside of the controller 10, the controller 10 may process the new command CMD_2 without having to increase the current consumed to be higher than or equal to the activation current value ACTIVE_C. Due to this, the problem of delay in the time when the controller 10 processes the new command CMD_2 can be solved.

In the above, it has been described that the controller 10 operates in the activation mode or the low-power mode based on the state of the plurality of sub-circuits SUB_C.

Hereinafter, specific examples of the plurality of sub-circuits SUB_C aforementioned will be described, and an operation of determining whether an activation condition is satisfied for each of the examples will be described.

Figure 8:
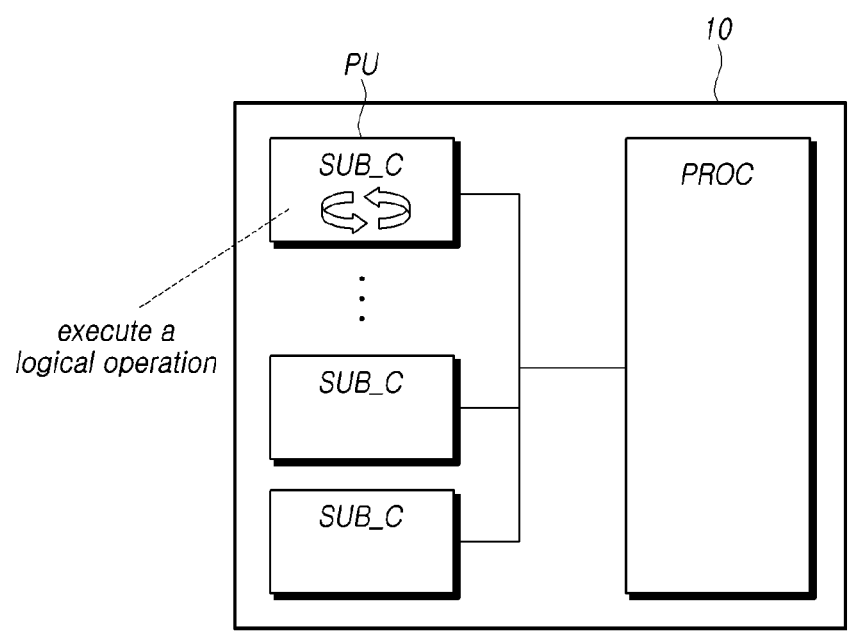
FIG. 8 is a diagram illustrating a processing unit as an example of a sub-circuit based on an embodiment of the disclosed technology.

FIG. 8 is a diagram illustrating a processing unit PU as an example of a sub-circuit SUB_C based on an embodiment of the disclosed technology.

Referring to FIG. 8, one of the plurality of sub-circuits SUB_C is a processing unit PU capable of executing logical operation. The processing unit PU may execute a logical operation for processing a specific operation according to a request from the processor PROC or independently. The processing unit PU may be a microprocessor capable of executing a logical operation, a processing core or a hardware module including the microprocessor or the processing core.

Figure 9:
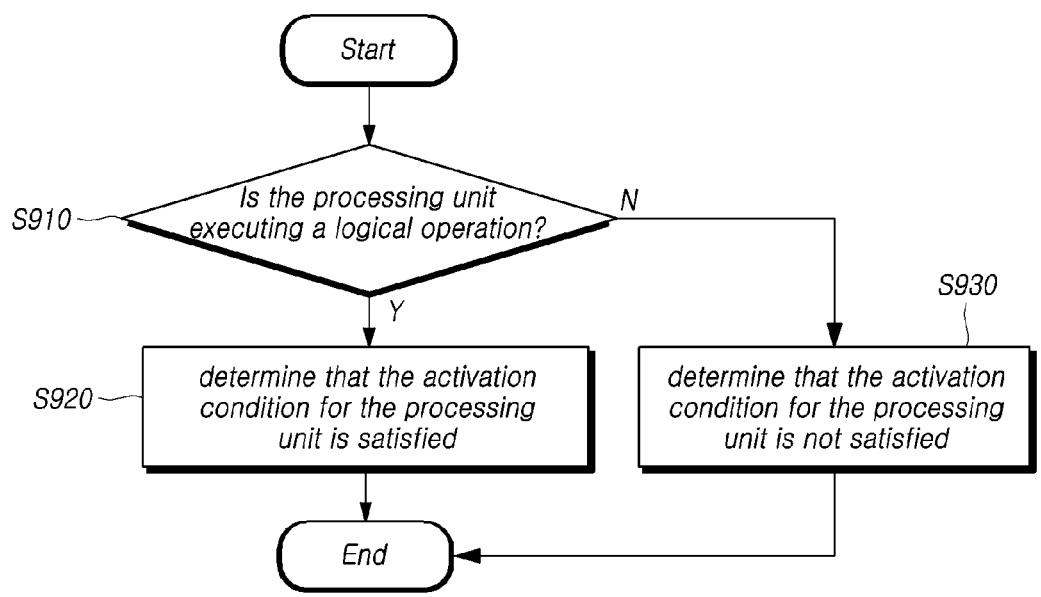
FIG. 9 is a flow chart illustrating an example of an operation in which the controller determines whether an activation condition for the processing unit described in FIG. 8 is satisfied.

FIG. 9 is a flow chart illustrating an example of an operation in which the controller 10 determines whether an activation condition for the processing unit PU described in FIG. 8 is satisfied.

Referring to FIG. 9, the processor PROC of the controller 10 determines whether the processing unit PU is executing a logical operation at the first time (S910).

When it is determined that the processing unit PU is executing a logical operation (S910—Y), the processor PROC determines that the activation condition for the processing unit PU is satisfied (S920). This is because sufficient current needs to be supplied to the processing unit PU so that the processing unit PU can quickly complete the logical operation being executed.

On the other hand, when it is determined that the processing unit PU is not executing a logical operation (e.g., sleep state) (S910—N), the processor PROC determines that the activation condition for the processing unit PU is not satisfied (S930).

Figure 10:
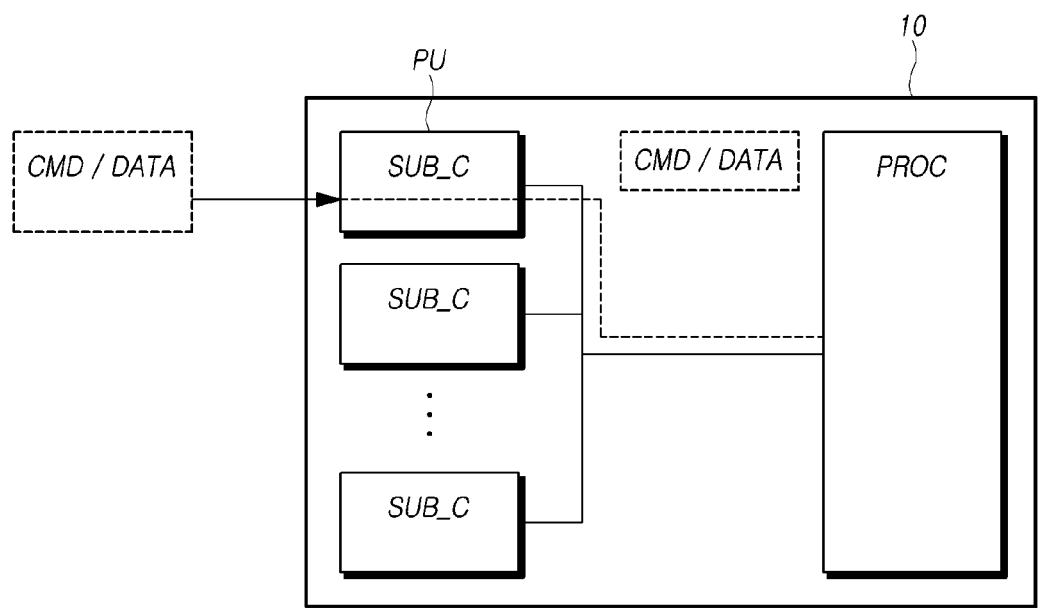
FIG. 10 is a diagram illustrating an example of the operation of the processing unit described in FIG. 8.

FIG. 10 is a diagram illustrating an example of the operation of the processing unit PU described in FIG. 8.

Referring to FIG. 10, the processing unit PU may execute a logical operation for transmitting a command CMD or data DATA received from the outside of the controller 10 to the processor PROC.

For example, when the controller 10 is the memory controller 120 described in FIG. 1, the processing unit PU may be the host interface 121 or the memory interface 122.

Figure 11:
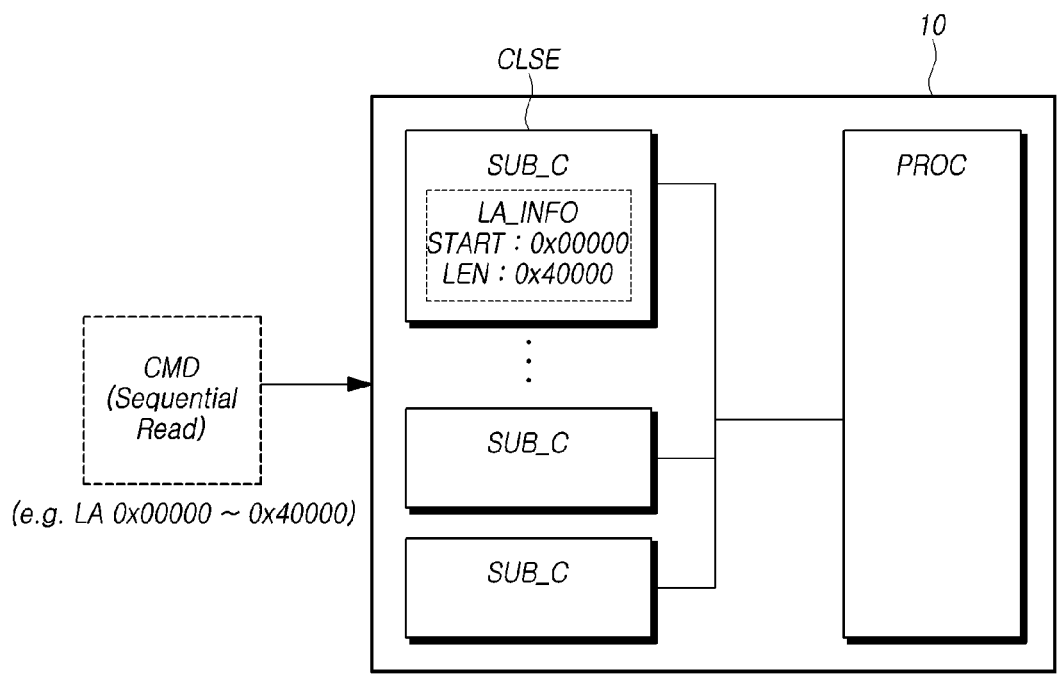
FIG. 11 is a diagram illustrating a sequential read information circuit as an example of a sub-circuit based on an embodiment of the disclosed technology.

FIG. 11 is a diagram illustrating a sequential read information circuit CLSE as an example of a sub-circuit SUB_C based on an embodiment of the disclosed technology.

Referring to FIG. 11, one of the plurality of sub-circuits SUB_C is a sequential read information circuit CLSE storing information on the logical address area for which the command CMD, received from outside of the controller 10, has requested sequential read.

In FIG. 11, the command CMD received by the controller 10 may request sequential read of a logical address area (e.g., 0x00000~0x40000). The processor PROC of the controller 10 may sequentially read data corresponding to the logical address area requested to be read by the command CMD.

In this case, the sequential read information circuit CLSE may store the information LA_INFO on the logical address area. For example, the sequential read information circuit CLSE may store the start address START (e.g., 0x00000) of the logical address area and the length LEN (e.g., 0x40000-0x00000=0x40000) of the logical address area.

For example, the processor PROC may determine whether a sequential read operation for the logical address area, from which the command CMD has requested sequential read, is being executed, based on the information LA_INFO stored in the sequential read information circuit CLSE.

For example, if the processor PROC is currently executing a read operation for the logical address 0x12345, the processor PROC may determine that a sequential read operation for the logical address area, for which the command CMD has requested sequential read, is being executed because the logical address 0x12345 is included in the logical address area 0x00000 to 0x40000 that the command CMD has requested to read.

Figure 12:
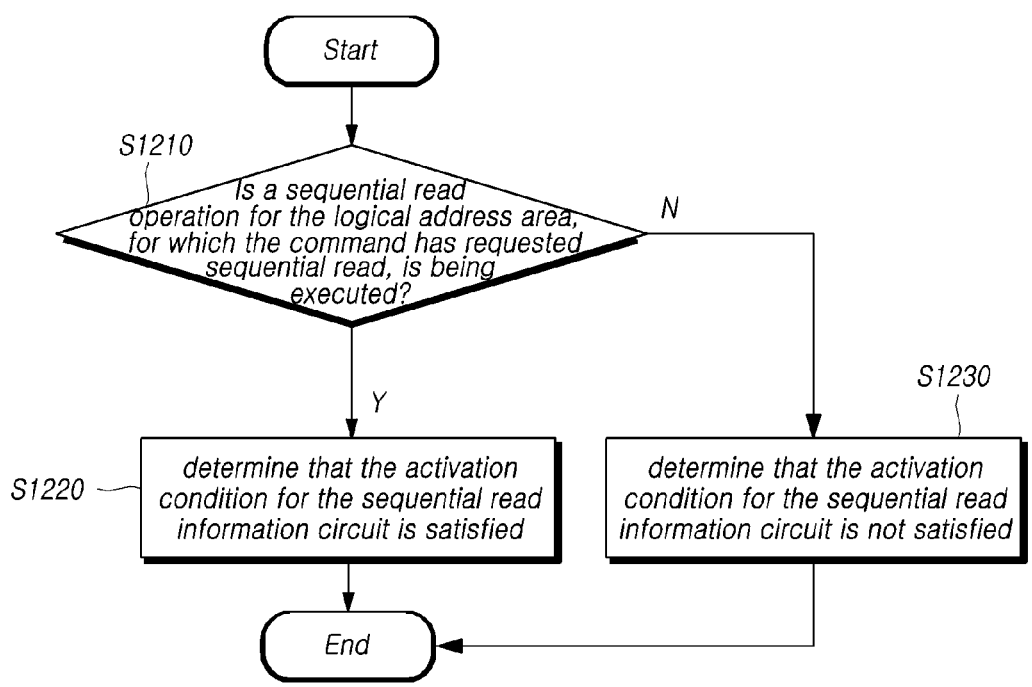
FIG. 12 is a flow chart illustrating an example of an operation in which the controller determines whether an activation condition for the sequential read information circuit described in FIG. 11 is satisfied.

FIG. 12 is a flow chart illustrating an example of an operation in which the controller 10 determines whether an activation condition for the sequential read information circuit CLSE described in FIG. 11 is satisfied.

Referring to FIG. 12, the processor PROC of the controller 10 determines whether a sequential read operation for the logical address area, for which the command CMD has requested sequential read at the first time point, is being executed (S1210).

When the sequential read operation for the logical address area is being executed (S1210—Y), the processor PROC determines that the activation condition for the sequential read information circuit CLSE is satisfied (S1220). This is because the controller 10 needs to operate in the activation mode in order to complete the sequential read operation for the logical address area.

On the other hand, when the sequential read operation for the logical address area is not being executed (S1210—N), the processor PROC determines that the activation condition for the sequential read information circuit CLSE is not satisfied (S1230).

Figure 13:
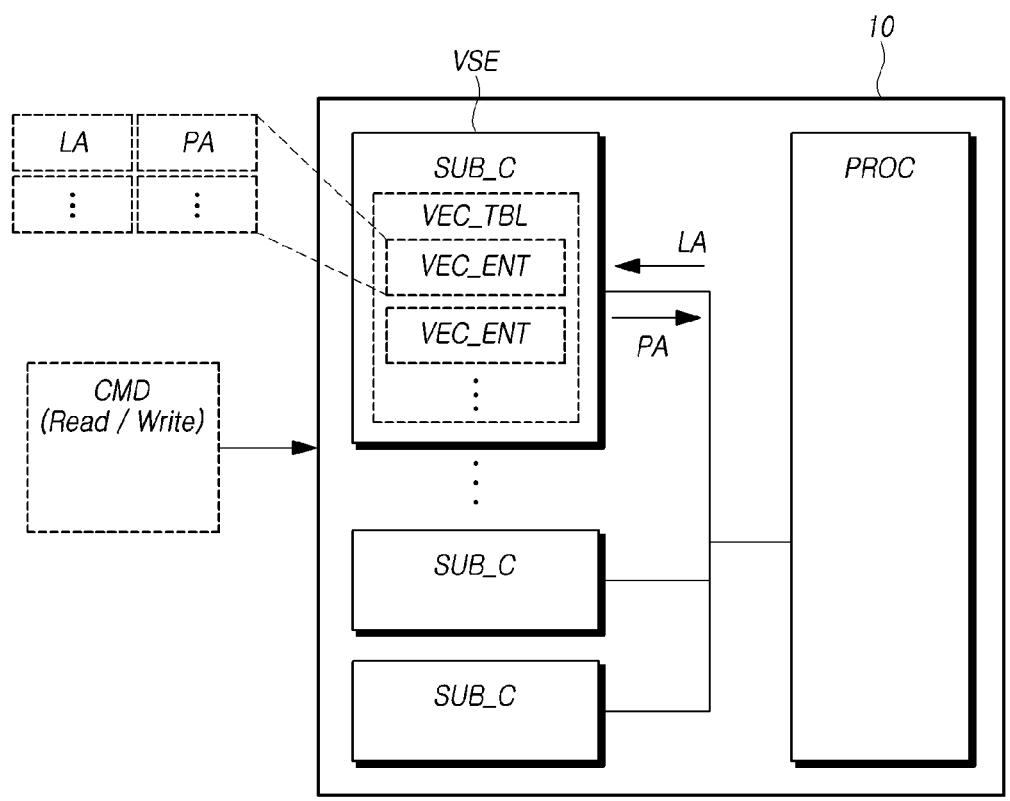
FIG. 13 is a diagram illustrating a vector search circuit as an example of a sub-circuit based on an embodiment of the disclosed technology.

FIG. 13 is a diagram illustrating a vector search circuit VSE as an example of a sub-circuit SUB_C based on an embodiment of the disclosed technology.

Referring to FIG. 13, one of the plurality of sub-circuits SUB_C may be a vector search circuit VSE searching for a physical address PA mapped to a logical address PA corresponding to the command CMD.

In this case, the command CMD received by the controller 10 from the outside of the controller 10 may be a read command or a write command.

For example, the vector search circuit VSE may search for a physical address PA corresponding to the logical address LA, to which the command CMD requested to read or write, corresponding to the command CMD.

Although the case where the vector table VEC_TBL is stored in the vector search circuit VSE has been described as an example in FIG. 13, the vector table VEC_TBL may be stored outside the vector search circuit VSE. In such a case, the vector search circuit VSE may access the vector table VEC_TBL stored outside of the vector search circuit VSE or load the vector table VEC_TBL into the vector search circuit VSE.

For example, the vector table VEC_TBL may include one or more vector table entries VEC_ENT. Each vector table entry VEC_ENT may indicate a physical address mapped to a logical address or may indicate a continuous physical address range corresponding to a logical address range.

For example, when the processor PROC requests a physical address (or physical address range) corresponding to a specific logical address to the vector search circuit VSE, the vector search circuit VSE transmits information on physical address (or physical address range) corresponding to the logical address to the processor PROC.

If the logical address to which read operation is to be executed is received, the vector search circuit VSE may transmit information on a physical address corresponding to the logical address and information indicating the size of continuous physical address region including the corresponding physical address to the processor PROC.

Upon receiving the logical address to which write operation is to be executed, the vector search circuit VSE may transmit the position (offset) of the vector table entry VEC_ENT, which corresponds to the logical address, in the vector table VEC_TBL to the processor PROC in order to indicate the physical address corresponding to the logical address.

Figure 14:
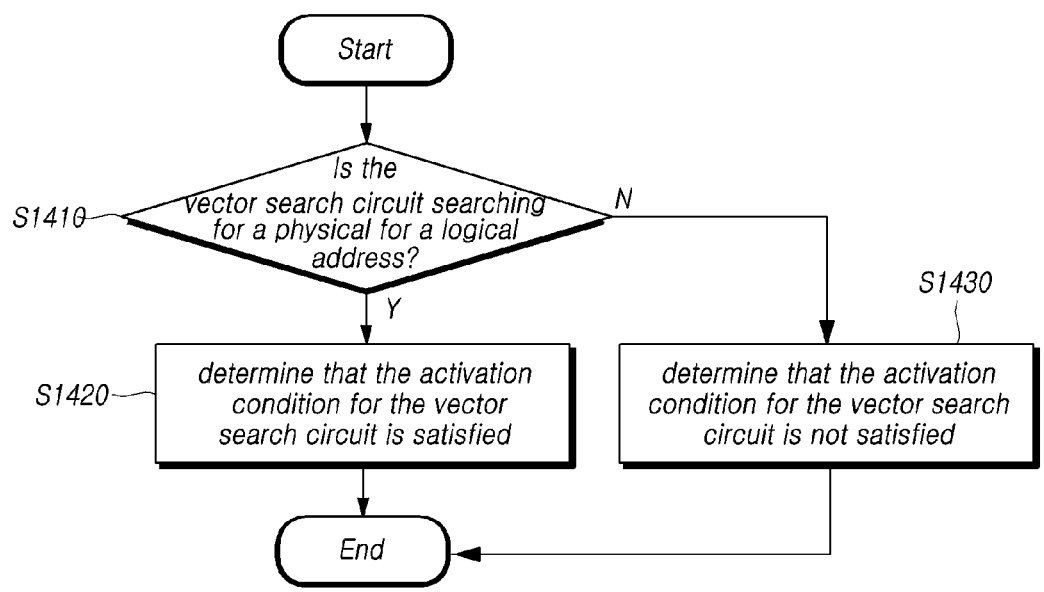
FIG. 14 is a flow chart illustrating an example of an operation in which the controller determines whether an activation condition for the vector search circuit described in FIG. 13 is satisfied.

FIG. 14 is a flow chart illustrating an example of an operation in which the controller 10 determines whether an activation condition for the vector search circuit VSE described in FIG. 13 is satisfied.

Referring to FIG. 14, the processor PROC of the controller 10 determines whether the vector search circuit VSE is executing an operation for searching for a physical address for a specific logical address at the first time point (S1410).

When the vector search circuit VSE is searching for a physical address for a specific logical address (S1410—Y), the processor PROC determines that activation condition for the vector search circuit is satisfied (S1420).

On the other hand, when the vector search circuit VSE is not searching for a physical address for a specific logical address (S1410—N), the processor PROC determines that activation condition for the vector search circuit is not satisfied (S1430).

Figure 15:
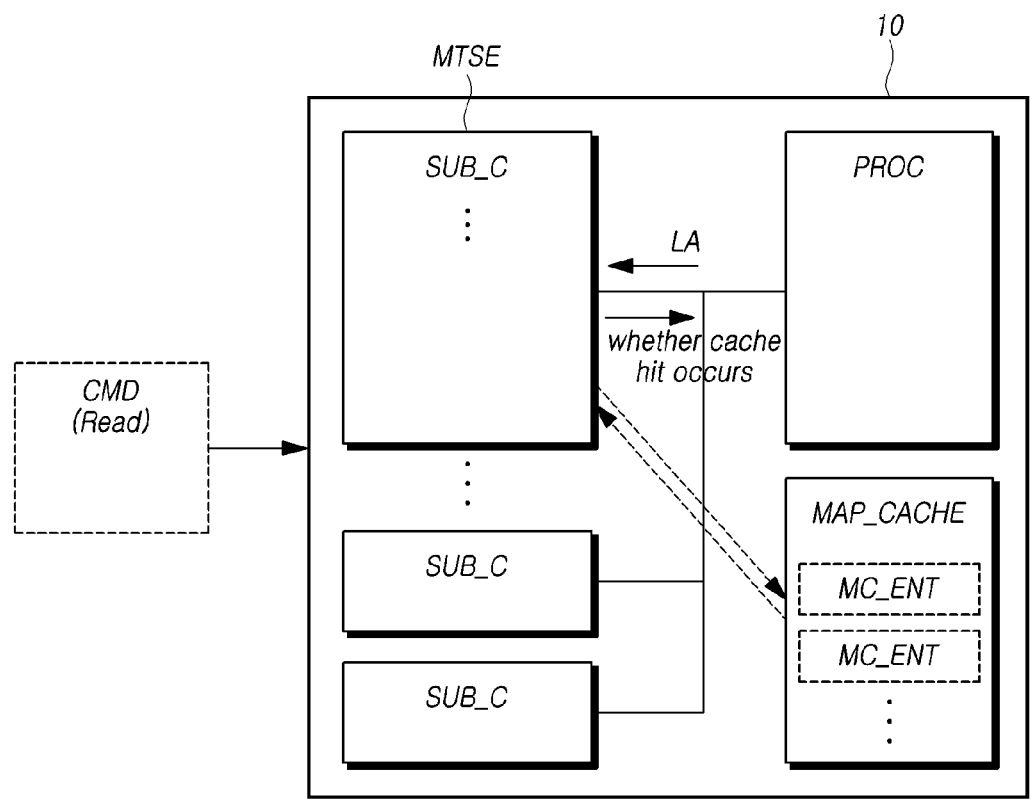
FIG. 15 is a diagram illustrating a mapping table search circuit as an example of a sub-circuit based on an embodiment of the disclosed technology.

FIG. 15 is a diagram illustrating a mapping table search circuit MTSE as an example of a sub-circuit SUB_C based on an embodiment of the disclosed technology.

Referring to FIG. 15, one of the plurality of sub-circuits is a mapping table search circuit MTSE searching for a map cache entry MC_ENT corresponding to a specific logical address LA in a map cache MAP_CACHE.

The map cache MAP_CACHE may cache one or more map cache entries MC_ENT, and each of the map cache entries MC_ENT may store information on a specific logical address and a physical address mapped thereto.

In FIG. 15, the map cache MAP_CACHE is located outside the processor PROC and the plurality of sub-circuits SUB_C, but it can be included in one of the processor PROC and/or the plurality of sub-circuits SUB_C.

When the mapping table search circuit MTSE receives a search request for a logical address LA from the processor PROC, the mapping table search circuit MTSE may search the map cache entry MC_ENT corresponding to the logical address LA in the map cache MAP_CACHE. Then the mapping table search circuit MTSE may indicate to the processor PROC whether the map cache entry MC_ENT corresponding to the logical address LA has been successfully searched (cache hit has occurred) in the map cache MAP_CACHE or not.

If the search is successful (that is, a cache hit occurs for the logical address LA), the mapping table search circuit MTSE may transmit information on the map cache entry MC_ENT or information on the physical address corresponding to the map cache entry MC_ENT to the processor PROC. On the other hand, when the search fails (that is, a cache miss occurs for the logical address LA), the mapping table search circuit MTSE may transmit information indicating that the search fails to the processor PROC.

Figure 16:
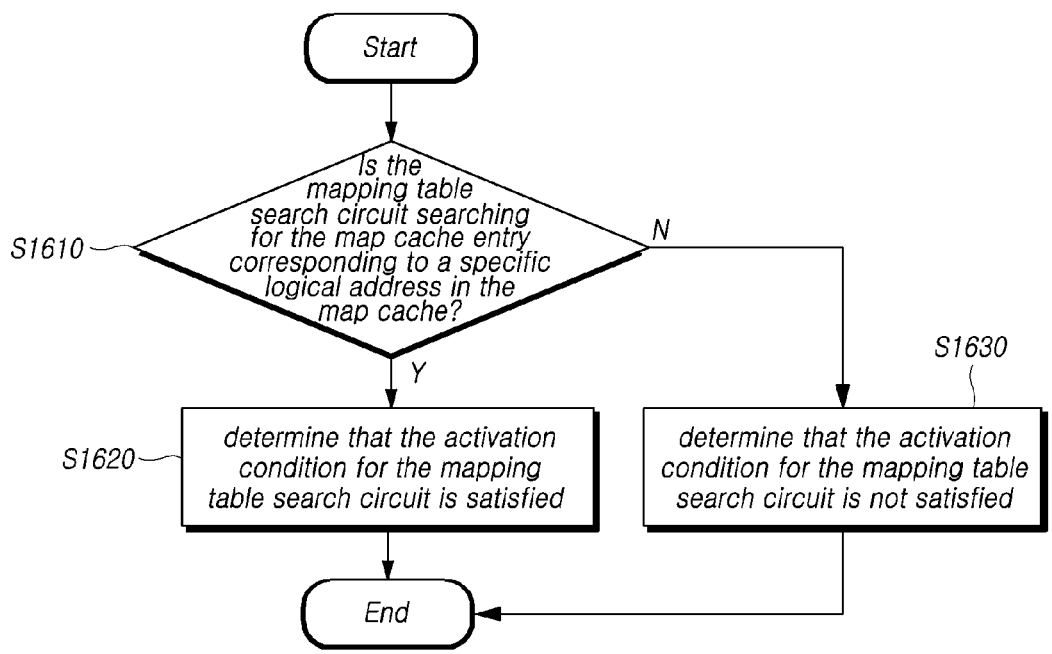
FIG. 16 is a flow chart illustrating an example of an operation in which the controller determines whether an activation condition for the mapping table search circuit described in FIG. 15 is satisfied.

FIG. 16 is a flow chart illustrating an example of an operation in which the controller 10 determines whether an activation condition for the mapping table search circuit described in FIG. 15 is satisfied.

Referring to FIG. 16, the processor PROC of the controller 10 determines whether the mapping table search circuit MTSE is executing an operation for searching for the map cache entry MC_ENT corresponding to a specific logical address in the map cache MAP_CACHE at the first time point (S1610).

When the mapping table search circuit MTSE is searching the map cache MAP_CACHE for the map cache entry MC_ENT corresponding to a specific logical address (S1610—Y), the processor PROC determines that activation condition for the mapping table search circuit MTSE is satisfied (S1620).

When the mapping table search circuit MTSE is not searching the map cache MAP_CACHE for the map cache entry MC_ENT corresponding to a specific logical address (S1610—N), the processor PROC determines that activation condition for the mapping table search circuit MTSE is satisfied (S1630).

Figure 17:
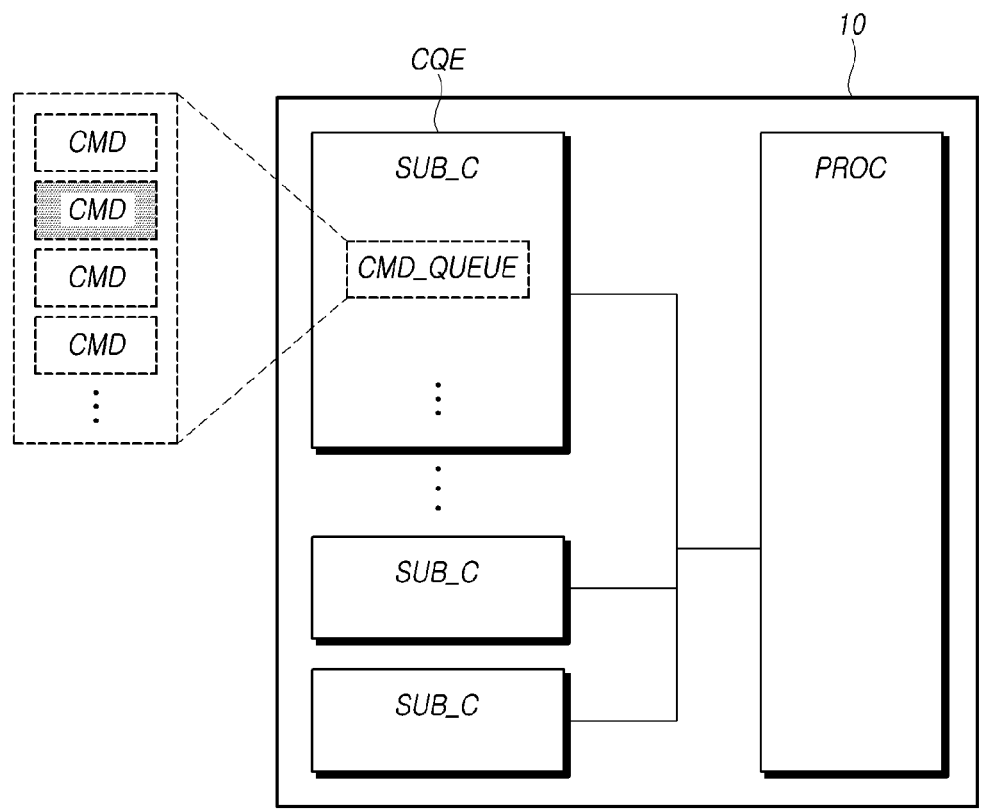
FIG. 17 is a diagram illustrating a command queue storage circuit as an example of a sub-circuit based on an embodiment of the disclosed technology.

FIG. 17 is a diagram illustrating a command queue storage circuit CQE as an example of a sub-circuit SUB_C based on an embodiment of the disclosed technology.

Referring to FIG. 17, one of the plurality of sub-circuits SUB_C may be a command queue storage circuit CQE storing a command queue CMD_QUEUE for queuing commands received from the outside of the controller 10.

For example, the command queue storage circuit CQE may be a volatile memory (e.g., SRAM, DRAM) capable of storing data. When the controller 10 is the memory controller 120 described in FIG. 1, the command queue storage circuit CQE may be the working memory 125.

The processor PROC may dequeue the command CMD from the command queue CMD_QUEUE and execute the dequeued command CMD.

In this case, some of the commands queued in the command queue CMD_QUEUE may be commands instructing an operation in an idle state. For example, the command instructing an operation in an idle state may be a command instructing to execute a background operation (e.g., garbage collection, wear leveling, read reclaim) in the idle state. The controller 10 may execute the operation in the idle state in the low-power mode.

Meanwhile, some of the commands CMD queued in the command queue CMD_QUEUE may be commands instructing an emergency operation (e.g., urgent garbage collection). The controller 10 should process a command instructing an emergency operation with a higher priority than other commands. For example, whether the received command is a command instructing an emergency operation may be determined by ID information indicating a level at which the corresponding command is to be processed (e.g., 0: normal priority, 1: high priority, 2: low priority, 3: urgent).

On the other hand, some of the commands CMD queued in the command queue CMD_QUEUE may be commands instructing operation on the module (e.g., memory buffer of the host HOST) located outside the controller 10 (e.g., loading the mapping information between the logical address and the physical address, which are stored in the controller 10, into the memory buffer of the host HOST).

After the controller 10 completes processing for the corresponding command, it can be expected that the possibility of receiving a new command from the outside of the controller 10 is low for a while.

In embodiments of the present disclosure, the controller 10 determines whether an activation condition for the command queue storage circuit CQE is satisfied according to which command is queued in the command queue storage circuit CQE.

Figure 18:
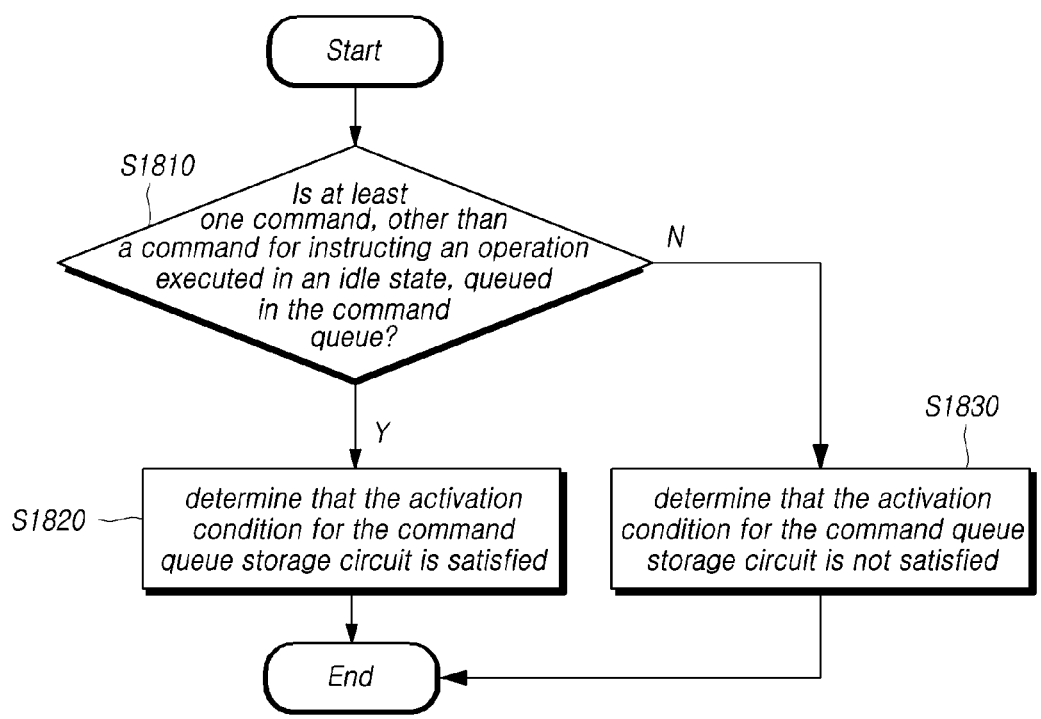
FIG. 18 is a flow chart illustrating an example of an operation in which the controller determines whether an activation condition for the command queue storage circuit described in FIG. 17 is satisfied.

FIG. 18 is a flow chart illustrating an example of an operation in which the controller 10 determines whether an activation condition for the command queue storage circuit CQE described in FIG. 17 is satisfied.

Referring to FIG. 18, the processor PROC of the controller 10 determines whether at least one command, other than a command for instructing an operation executed in an idle state, is queued in the command queue CMD_QUEUE at the first time point (S1810).

When at least one command, other than a command for instructing an operation executed in an idle state, is queued in the command queue CMD_QUEUE (S1810—Y), the processor PROC determines that activation condition for the command queue storage circuit CQE is satisfied (S1820).

When no command, other than a command for instructing an operation executed in an idle state, is queued in the command queue CMD_QUEUE (S1810—N), the processor PROC determines that activation condition for the command queue storage circuit CQE is not satisfied (S1830). This is because the command queue storage circuit CQE does not need to be activated if the command queue CMD_QUEUE is empty, and a command instructing an operation in the idle state can be executed in the low-power mode.

Figure 19:
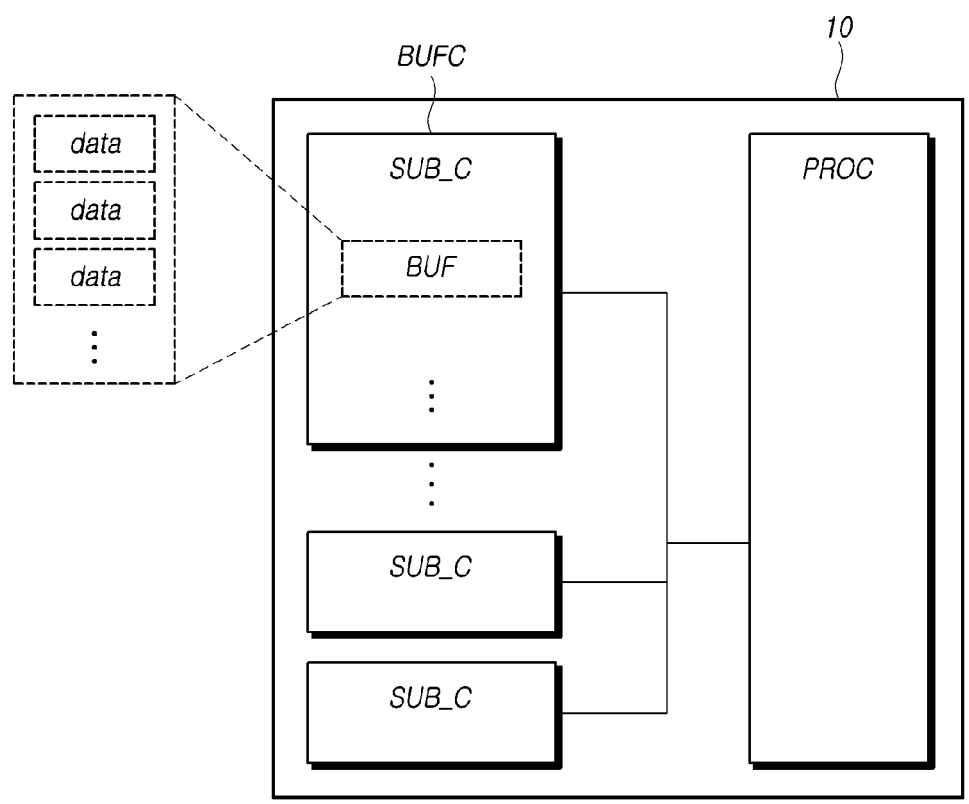
FIG. 19 is a diagram illustrating a buffer storage circuit as an example of a sub-circuit based on an embodiment of the disclosed technology.

FIG. 19 is a diagram illustrating a buffer storage circuit BUFC as an example of a sub-circuit SUB_C based on an embodiment of the disclosed technology.

Referring to FIG. 19, one of the plurality of sub-circuits SUB_C may be a buffer storage circuit BUFC storing a buffer BUF.

For example, the buffer storage circuit BUFC may be a volatile memory (e.g., SRAM, DRAM) capable of storing data. When the controller 10 is the memory controller 120 described in FIG. 1, the buffer storage circuit BUFC may be the working memory 125.

In this case, the buffer BUF may store data, and the data may be read data or write data.

Figure 20:
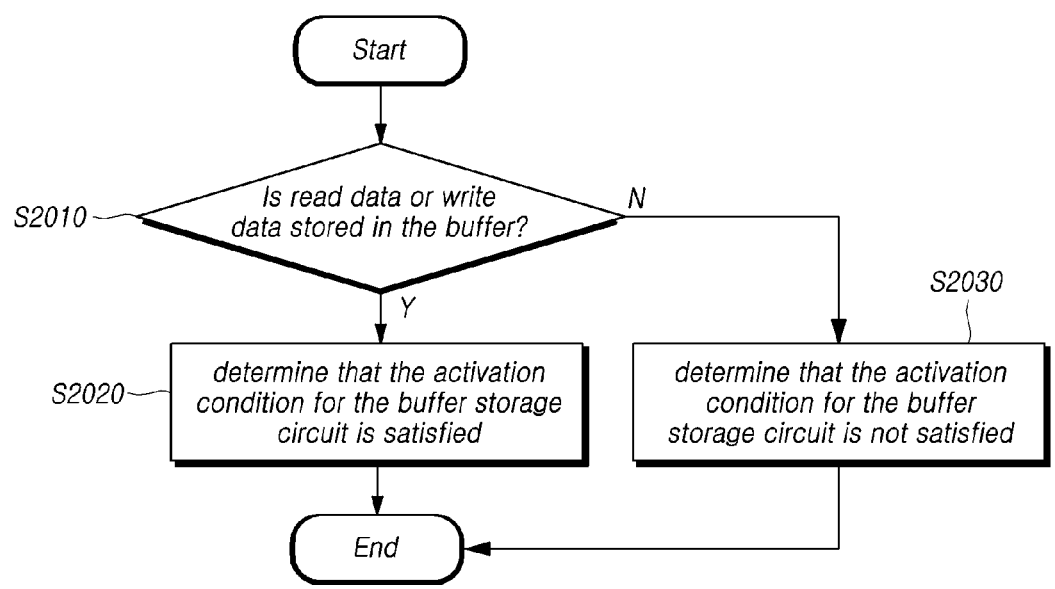
FIG. 20 is a flow chart illustrating an example of an operation in which the controller determines whether an activation condition for the buffer storage circuit described in FIG. 19 is satisfied.

FIG. 20 is a flow chart illustrating an example of an operation in which the controller 10 determines whether an activation condition for the buffer storage circuit BUFC described in FIG. 19 is satisfied.

Referring to FIG. 20, the processor PROC of the controller 10 determines whether read data or write data is stored in the buffer BUF at the first time point (S2010).

When read data or write data is stored in the buffer BUF (S2010—Y), the processor PROC determines that activation condition for the buffer storage circuit BUFC is satisfied (S2020). This is because there is a high possibility that a flush operation is performed on the data stored in the buffer BUF.

When neither read data and write data is stored in the buffer BUF (S2010—N), the processor PROC determines that activation condition for the buffer storage circuit BUFC is not satisfied (S2030).

Figure 21:
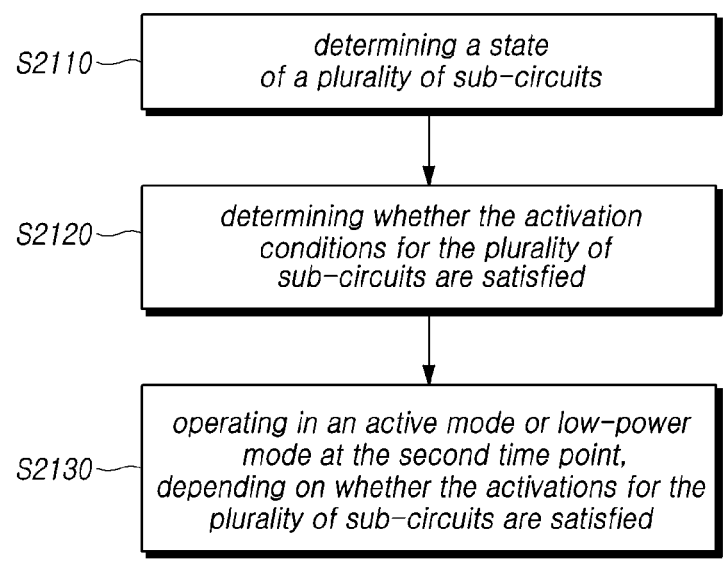
FIG. 21 is a diagram illustrating a method for operating the controller based on an embodiment of the disclosed technology.

FIG. 21 is a diagram illustrating a method for operating the controller 10 based on an embodiment of the disclosed technology.

Referring to FIG. 21, the method for operating the controller 10 may include determining a state of a plurality of sub-circuits SUB_C (S2110).

And the method for operating the controller 10 may include determining whether the activation conditions for the plurality of sub-circuits SUB_C are satisfied at a first time point (S2120).

For example, one of the plurality of sub-circuits SUB_C is processing unit PU capable of executing logical operation.

In this case, the operation S2120 may determine that activation condition for the processing unit PU is satisfied when the processing unit PU is executing a logical operation at the first time point.

For example, one of the plurality of sub-circuits SUB_C is a sequential read information circuit CLSE storing information on the logical address area for which the command has requested sequential read.

In this case, the operation S2120 may determine that activation condition for the sequential read information circuit CLSE is satisfied when the sequential read operation for the logical address area is being executed at the first time point.

For example, one of the plurality of sub-circuits SUB_C is a vector search circuit VSE searching for a physical address mapped to a logical address corresponding to the command received from outside of the controller 10.

In this case, the operation S2120 may determine that activation condition for the vector search circuit VSE is satisfied when the vector search circuit VSE is searching for a physical address for a specific logical address at the first time point.

For example, one of the plurality of sub-circuits SUB_C is a mapping table search circuit MTSE searching for a map cache entry MC_ENT corresponding to a specific logical address in a map cache MAP_CACHE. The map cache MAP_CACHE caches map cache entries MC_ENT including mapping information between logical address and physical address.

In this case, the operation S2120 may determine that activation condition for the mapping table search circuit MTSE is satisfied when the mapping table search circuit MTSE is searching the map cache MAP_CACHE for the map cache entry MC_ENT corresponding to a specific logical address at the first time.

For example, one of the plurality of sub-circuits SUB_C is a command queue storage circuit CQE storing a command queue CMD_QUEUE for queuing commands received from the outside of the controller 10.

In this case, S2120 may determine that activation condition for the command queue storage circuit CQE is satisfied when at least one command, other than a command for instructing an operation executed in an idle state, is queued in the command queue CMD_QUEUE at the first time point.

For example, one of the plurality of sub-circuits SUB_C is a buffer storage circuit BUFC storing a buffer BUF that stores read data or write data.

In this case, S2120 may determine that activation condition for the buffer storage circuit BUFC is satisfied when read data or write data is stored in the buffer BUF at the first time point.

The method for operating the controller 10 may include operating in an activation mode or low-power mode at the second time point, depending on whether the activation conditions for the plurality of sub-circuits are satisfied (S2130).

The second time point may be a time point after a predetermined time has elapsed from the time point when a current greater than the activation current value is used after receiving a command from the outside of the controller 10.

The activation mode is a mode using an electrical current greater than or equal to the activation current value, and the low-power mode is a mode using an electrical current lower than the activation current value.

In the embodiments of the present disclosure, the operation S2130 may operate in an activation mode after the second time point on determination that the activation condition for at least one of the plurality of sub-circuits SUB_C is satisfied. On determination that activation conditions for all of the plurality of sub-circuits are not satisfied, the operation S2130 may operate in a low-power mode after the second time point. The plurality of sub-circuits may refer to some or all of the sub-circuits implemented in the controller.

Figure 22:
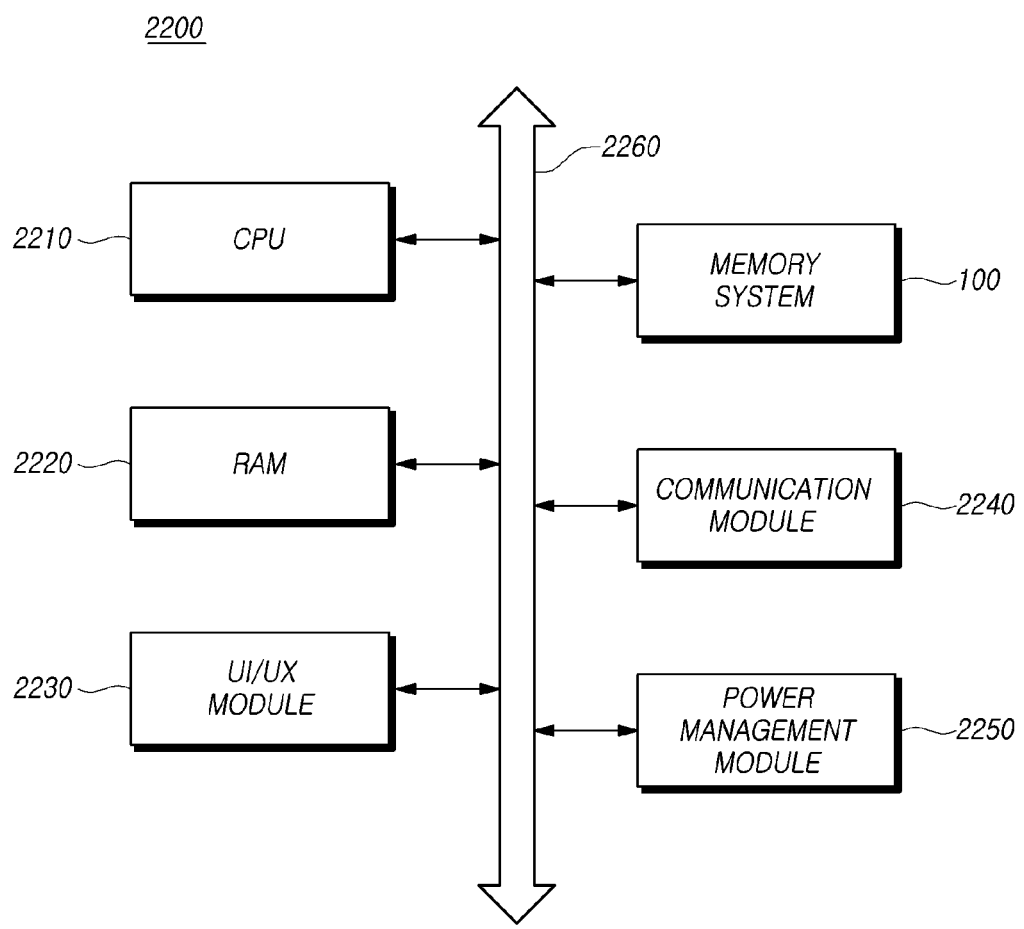
FIG. 22 is a diagram illustrating the configuration of a computing system based on some embodiments of the disclosed technology.

FIG. 22 is a diagram illustrating the configuration of a computing system 2200 based on an embodiment of the disclosed technology.

Referring to FIG. 22, the computing system 2200 based on an embodiment of the disclosed technology may include: a memory system 100 electrically connected to a system bus 2260; a CPU 2210 configured to control the overall operation of the computing system 2200; a RAM 2220 configured to store data and information related to operations of the computing system 2200; a user interface/user experience (UI/UX) module 2230 configured to provide the user with a user environment; a communication module 2240 configured to communicate with an external device as a wired and/or wireless type; and a power management module 2250 configured to manage power used by the computing system 2200.

The computing system 2200 may be a personal computer (PC) or may include a mobile terminal such as a smartphone, a tablet or various electronic devices.

The computing system 2200 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A controller comprising:
a plurality of sub-circuits; and
a processor configured to:
control the controller to operate in an activation mode for the controller using a current with a current value greater than or equal to an activation current, in response to receiving a command from outside;
determine whether activation conditions of the plurality of sub-circuits are satisfied during the activation mode, each of the activation conditions indicating whether a corresponding sub-circuit requires a current with a current value greater than or equal to the activation current; and
control the controller to operate in a low-power mode for the controller using a current with a current value lower than the activation current value, when the activation conditions of all of the plurality of sub-circuits are not satisfied and a predetermined time has elapsed from an initiation of the activation mode.

2. The controller of claim 1,
wherein the processor is configured to determine whether activation conditions of the plurality of sub-circuits are satisfied at a first time point,
wherein the processor is configured to control the controller to operate in the activation mode or in the low-power mode at a second time point,
wherein the second time point is a time point after a predetermined time has elapsed from when a current greater than or equal to the activation current value is used to process a command received from outside the controller,
wherein the first time point is the time point when a predetermined time elapses after the controller receives the command from the outside of the controller, and
wherein the second time point is determined according to information of the command.

3. The controller of claim 2,
wherein one of the plurality of sub-circuits is a processing unit capable of executing logical operation, and
wherein the processor is operable to determine that an activation condition for the processing unit is satisfied when the processing unit is executing a logical operation at the first time point.

4. The controller of claim 3,
wherein the logical operation is for transmitting an external command or data received from outside of the controller to the processor.

5. The controller of claim 2,
wherein one of the plurality of sub-circuits is a sequential read information circuit that is operable to store information on a logical address area for which the command has requested a sequential read operation, and
wherein the processor is operable to determine that an activation condition for the sequential read information circuit is satisfied when the sequential read operation for the logical address area is being executed at the first time point.

6. The controller of claim 2,
wherein one of the plurality of sub-circuits is a vector search circuit that is operable to search for a physical address mapped to a logical address corresponding to the command, and
wherein the processor is operable to determine that an activation condition for the vector search circuit is satisfied when the vector search circuit is searching for a physical address for a specific logical address at the first time point.

7. The controller of claim 2,
wherein one of the plurality of sub-circuits is a mapping table search circuit that is operable to search for a map cache entry corresponding to a specific logical address in a map cache that caches map cache entries containing mapping information between logical and physical addresses, and
wherein the processor is operable to determine that an activation condition for the mapping table search circuit is satisfied when the mapping table search circuit is searching the map cache for the map cache entry corresponding to the specific logical address at the first time point.

8. The controller of claim 2,
wherein one of the plurality of sub-circuits is a command queue storage circuit operable to store a command queue for queuing commands received from outside the controller, and
wherein the processor is operable to determine that an activation condition for the command queue storage circuit is satisfied when at least one command, other than a command for instructing an operation executed in an idle state, is queued in the command queue at the first time point.

9. The controller of claim 2,
wherein one of the plurality of sub-circuits is a buffer storage circuit having a buffer that stores read data or write data, and
wherein the processor is operable to determine that an activation condition for the buffer storage circuit is satisfied when read data or write data is stored in the buffer at the first time point.

10. A method for operating a controller, comprising:
controlling the controller to operate in an activation mode for the controller using a current with a current value greater than or equal to an activation current, in response to receiving a command from outside;
determining whether activation conditions of the plurality of sub-circuits are satisfied during the activation mode, each of the activation conditions indicating whether a corresponding sub-circuit requires a current with a current value greater than or equal to the activation current;
and
controlling the controller to operate in a low-power mode for the controller using a current with a current value lower than the activation current value, when the activation conditions of all of the plurality of sub-circuits are not satisfied and a predetermined time has elapsed from an initiation of the activation mode.

11. The method according to claim 10,
wherein activation conditions of the plurality of sub-circuits are satisfied is determined at a first time point, whether controlling the controller to operate in the activation mode or in the low-power mode at a second time point,
wherein the second time point is a time point after a predetermined time has elapsed from when a current greater than or equal to the activation current value is used to process a command received from outside the controller,
wherein the first time point is the time point when a predetermined time elapses after the controller receives the command from the outside of the controller, and
wherein the second time point is determined according to information of the command.

12. The method according to claim 10,
wherein one of the plurality of sub-circuits is a processing unit capable of executing logical operation, and
wherein an activation condition for the processing unit is satisfied when the processing unit is executing a logical operation at the first time point.

13. The method according to claim 10,
wherein the logical operation is for transmission of an external command or data received from outside of the controller.

14. The method according to claim 10,
wherein one of the plurality of sub-circuits is a sequential read information circuit operable to store information on the logical address area for which the command has requested a sequential read, and
wherein an activation condition for the sequential read information circuit is satisfied when the sequential read operation for the logical address area is being executed at the first time point.

15. The method according to claim 10,
wherein one of the plurality of sub-circuits is a vector search circuit operable to search for a physical address mapped to a logical address corresponding to the command, and
wherein an activation condition for the vector search circuit is satisfied when the vector search circuit is searching for a physical address for a specific logical address at the first time point.

16. The method according to claim 10,
wherein one of the plurality of sub-circuits is a mapping table search circuit operable to search for a map cache entry corresponding to a specific logical address in a map cache that caches map cache entries containing mapping information between logical and physical addresses, and
wherein an activation condition for the mapping table search circuit is satisfied when the mapping table search circuit is searching the map cache for the map cache entry corresponding to a specific logical address at the first time.

17. The method according to claim 10,
wherein one of the plurality of sub-circuits is a command queue storage circuit operable to store a command queue for queuing commands received from the outside of the controller, and
wherein an activation condition for the command queue storage circuit is satisfied when at least one command, other than a command for instructing an operation executed in an idle state, is queued in the command queue at the first time point.

18. The method according to claim 10,
wherein one of the plurality of sub-circuits is a buffer storage circuit operable to store a buffer that stores read data or write data, and
wherein an activation condition for the buffer storage circuit is satisfied when read data or write data is stored in the buffer at the first time point.

* * * * *